UNITED STATES PATENT OFFICE.

HENRY DREYFUS, OF BASEL, SWITZERLAND.

CELLULOSE ACETATES AND PROCESS OF MAKING SAME.

1,181,857.   Specification of Letters Patent.   Patented May 2, 1916.

No Drawing.   Application filed October 2, 1911.   Serial No. 652,442.

*To all whom it may concern:*

Be it known that I, HENRY DREYFUS, a citizen of the Republic of Switzerland, residing at Basel, Switzerland, have invented certain new and useful Improvements in Cellulose Acetates and Processes of Making Same, of which the following description is a specification.

The present invention relates to cellulose acetates having special properties, and the methods whereby such acetates are produced.

The known processes of making cellulose acetates mostly depend upon the selection of the particular condensing agent to be employed. The greater part of the patents assume that sulfuric acid is highly injurious on account of its great splitting action on cellulose. Accordingly various substitutes therefor have been proposed, such as hydrochloric, nitric, nitrosulfuric acids, or salts such as zinc chlorid, sodium bisulfate, sulfonic acids, chloracetic acid, etc. In some of these processes, either cellulose or hydrocellulose may be employed, e. g. that produced by the Girard process, using sulfuric acid of 3% strength, or by using sulfuric and glacial acetic acid. Other processes use moist cellulose to avoid splitting of the cellulose. Each of these processes is said to have its own special advantages, and with the process using sulfuric acid, etc., and glacial acetic acid, solutions are obtained which have more or less viscosity, or limpidity, according to the exact procedure.

The products heretofore produced, have been in nearly all cases soluble in chloroform, and in glacial acetic acid. Films made therefrom have been either stretchy, flexible, brittle or otherwise objectionable, rendering them practically useless, for most purposes.

In my present invention I have found a process for the direct manufacture, by a direct acetylization process of cellulose acetates insoluble in chloroform, but soluble in a mixture of chloroform and alcohol, which acetates are also insoluble in diluted or concentrated alcohol. Some of these products are soluble in pure acetone, others are distinguished by a characteristic behavior upon treating them with pure acetone. They become transparent or semi-fluid and plastic therein, and by the addition of a small quantity of water, they produce viscous solutions. In carrying out this process, there is no intermediate stage, in which the cellulose acetates become soluble in chloroform. I have found that the manufacture of these products depends upon a series of conditions, which must be present in carrying out the reaction. Thus the production of this result depends upon the simultaneous control, relative to each other, of the temperature employed in the reaction, the humidity or amount of moisture present in the cellulosic material employed, the amount of condensing agent employed, the character of the condensing agent employed, and the quantity of acetylating agent relative to the weight of cellulose used. These are some of the factors which are in mutual dependence with each other, and which determine the properties of the cellulose acetates produced in carrying out the process. I have found that, in the preparation of such acetates, sulfuric acid as the condensing agent, is perfectly satisfactory, provided that certain precautions are observed, as follows:—1, in carrying out the process at a temperature not above 40° C., and preferably at ordinary room temperature, or by cooling to a lower temperature; 2, in employing the proper quantity of the acetylizing agent; 3, in employing the proper quantity of the condensing agent; 4, the amount of moisture in the cellulose or hydrocellulose or partially acetylized cellulose employed.

My new process depends (among other conditions) upon carrying out the process of acetylation at or below ordinary room temperature, that is up to about 30° C., and upon employing particular proportions of acetic anhydrid or acetyl chlorid, and of sulfuric acid or other condensing agent; both as compared with the amount of cellulose, and also depending upon the amount of moisture present in the cellulose, or other cellulosic body. These conditions depend upon each other, and determine the properties of the resulting products. If 10% of sulfuric acid, based on the weight of cellulose, is used, the amount of acetic anhydrid used can be varied between 1.5 and 3 kg. (preferably 1.8 kg. to 3 kg.) to each kilo of cellulose or cellulose derivatives. If more than 10% of sulfuric acid, say up to 20%, be employed, then (in addition to the 1.5 to 3 kg. of acetic anhydrid above referred to, per kg. of cellulosic material) there will be used an additional quantity of acetic anhydrid, up to about four times the weight of sulfuric acid used. These figures are based on using sulfuric acid 95 to 100% strength, pure acetic anhydrid, and cellulose containing 5 to 6% of moisture, and working at ordinary room temperature. If the cellulose used contain more or less than this amount of moisture, the amount of acetic anhydrid will be increased or diminished accordingly.

Using 10% of sulfuric acid, and 3 kg. of acetic anhydrid, per kilo of cellulose containing 5 to 6% of moisture and keeping the reacting materials at or below ordinary room temperature, products extremely soluble in alcohol-chloroform, but insoluble in chloroform alone, will be formed, while if dry cellulose, or more acetic anhydrid is used with the same amount of sulfuric acid, a product soluble in chloroform will be produced. I have also found that if it is desired to use a larger amount of sulfuric acid, the amount of moisture in the cellulose to be employed should be decreased, otherwise insoluble, pasty or mucilaginous products will be obtained. If 20% or more of sulfuric acid is to be used the cellulose should preferably be dry, for example cellulose having been dried at 25 to 50° C., in a dry room, when first treated, as above described, with a mixture of sulfuric and glacial acetic acid. It is not advisable to too much hydrolyze the cellulose before the introduction of acetic anhydrid or other acetylizing agents. Using cellulose containing 5% of moisture it is preferable to introduce it directly into a mixture of glacial acetic acid, acetic anhydrid and sulfuric acid.

If as much as 25% of sulfuric acid is to be used, dry cellulose should preferably be used, and it should be directly added to the above described mixture, otherwise a gelatinous product more or less easily soluble in dilute alcohol or hot water will be produced.

I have found, that in order to cause the acetylization to take place in a regular manner, it is preferable to add the acetic anhydrid, or other acetylizing agent, to the mixture of glacial acetic acid, sulfuric acid and cellulose, while constantly stirring the reacting mass. For the manufacture, in one operation, of products having a very great solubility, the amount of sulfuric acid should be between about 10 and 20% of the weight of the cellulose used, and the above proportions between the sulfuric acid, moisture content of the cellulose and acetic anhydrid should be rather closely followed. In this manner one can obtain products which are capable of producing very concentrated solutions of cellulose acetates in alcohol-chloroform or alcohol-tetrachlorethane and which can be used directly in the manufacture of celluloid, etc. These cellulose acetates can also be produced in suspension by using appropriate indifferent diluents. The resulting products are also distinguished from the cellulose acetates heretofore known, by their insolubility in chloroform and by their great solubility in alcohol-chloroform.

In order to carry out my process, dry cellulose, or cellulose with a moisture content of, say about 5%, or cellulose previously treated with diluted sulfuric acid (and dried down to about 5% of moisture,) or preferably a cellulose previously treated with a mixture of glacial acetic and sulfuric acids, or a hydro-cellulose (provided the latter is not too much decomposed), may be used. It is evident that the afore-mentioned proportions between the moisture content, amount of sulfuric acid, the amount of acetylizing agent and temperature must be closely followed. By this energetic hydration, that is to say by the preceding hydrolization at low temperatures for example by the treatment with sulfuric and glacial acetic acids, it is to be noted that the cellulose molecule will not be destroyed or depolymerized but it is possible to produce these more or less stiff solutions, of a viscosity which never could be produced by any of the processes previously known. I call attention to the fact that when this treatment at low temperature is continued for some time, there is no danger of depolymerization of the cellulose molecule during the acetylization step. Also the low temperature at the commencement of the acetylization does not have any disadvantageous effect, apparently since the entering acetyl groups have a protecting influence upon the cellulose molecule. That the hydration at low temperatures does have a protecting effect is apparently due to the fact that in the hydration or treatment during and after the introduction of the cellulose into the acetylizing mixture at, or preferably below, ordinary room temperature, the temperature does not rise much above this point. In accordance with my invention however, I have found that only those cellulose acetates which are substantially insoluble in chloroform, but which become readily soluble by the addition thereto of more or less alcohol, (some of which cellulose acetates are readily soluble in acetone, and others of which are very soluble in diluted acetone containing a small amount of water,) are of value for the production, (by further transformation) of products having useful solubilities, and other useful properties. These are produced in the present invention, in observing the conditions of temperature, quantity of sulfuric acid, quantity of acetic anhydrid and the like, relative to each other.

In accordance with my invention, by directly introducing the cellulose, and maintaining the materials at or below ordinary room temperature, unless observing the conditions above pointed out, there will be obtained only syrupy products, which contain cellulose acetates readily soluble in chloroform, and which also contain a large quantity of unchanged fibers. Such products are not of value for the production of celluloid and films.

In order to obtain valuable products, the temperature during the introduction of the cellulose, and up to the completion of the reaction, must in every case be kept down. In operating in this manner, syrupy liquids are not obtained, but solutions of the highest viscosity, which do not contain a large quantity of unchanged fibers, and accordingly the products produced in accordance with my process are transparent, and give in the acetylating solution, very viscous products which may even approach a stiff or gelatinous mass. These products and especially their transformation products, give solutions of the highest viscosity, which products can therefore be employed in the celluloid and film industries.

In order to obtain rapidly a highly viscous solution, approaching in consistency a a clear, stiff gelatinous mass, in accordance with my present invention, it is necessary to use very low temperatures. A product insoluble in chloroform, together with a high viscosity can be obtained if the temperature is not allowed, even in approaching the end of the acetylation, to approach 40° C., and the temperature during the entire process is preferably kept at or below ordinary room temperature, to secure the best results. But in connection with this, I call attention to the fact that the products of the present invention are not intermediate products produced in the processes heretofore employed for the production of chloroform-soluble cellulose acetates, since in observing the conditions above stated to be necessary in my process, syrupy solutions will never be obtained. In many instances, at the end of the acetylizing reaction, there will be present clear, very viscous solutions, or clear gelatinous masses, of such a high viscosity that they are scarcely movable or are wholly immovable, that is to say they congeal from their acetylation solutions, so that they can be pulverized. Such products can not be produced if the cellulose is introduced into an acetylizing mixture having a temperature at above ordinary room temperature.

I again call attention to the fact that the present invention does not depend upon the temperature and the quantity of sulfuric acid alone, but upon these factors in connection with the amount of moisture in the cellulose employed, and this latter has to be taken in consideration. In a general way the greater the amount of moisture present in the cellulose employed, the smaller must be the quantity of condensing agent to be employed, and all the above factors must be kept in mutual dependence one upon the other. In using a cellulose containing about 5 to 6% of moisture, better results are secured than with a dry cellulose, since with a dry cellulose the reaction goes on much more slowly, and in connection therewith other inconveniences result, for example that the viscosity of the solution does not appear until the last moment, when a clear solution or clear mass is obtained.

In accordance with my invention it is further necessary to use a quantity of an acetylating agent, such as acetic anhydrid, preferably not more than three times, and more preferably about two and one-half times the weight of the cellulose employed, since the excess of acetylating agent makes it more difficult to observe the preferable temperature, and makes it also more difficult to interrupt the reaction at the proper time. If smaller quantities of sulfuric acid as a condensing agent have been used, it is easier to regulate the temperature but the reaction does not go on so energetically. It is always necessary to employ a certain minimum quantity of sulfuric acid, relatively to the weight of cellulose used, in order to obtain technically valuable products. Accordingly the quantity of sulfuric acid can not arbitrarily be changed, but can be changed only according to the other conditions present in the reaction, (e. g. amount of moisture, etc). The most favorable results for obtaining these cellulose acetates, insoluble in chloroform are obtained especially by the direct introduction of the cellulose into the acetylating mixture of for example glacial acetic acid, acetic anhydrid, and sulfuric acid, if one employs between 10% and 20% of sulfuric acid (and with advantage not under 5%) calculated upon the weight of the cellulose employed. In this case one obtains products, some of which are easily soluble in such solvents as concentrated acetone, and others in somewhat diluted acetone, which products, by their further transformation (for example in a precipitated form) give other solubilities.

The products, obtained by my process are distinguished in that while they are insoluble in chloroform, or in tetrachlorethane they can be dissolved to produce very concentrated solutions in alcohol-chloroform, or in alcohol-tetrachlorethane, etc., which was not possible with the products heretofore produced by any direct process.

The products obtained in my process are especially distinguished from those previously produced, by their great stability which is also true of the articles made therefrom, by their being substantially insoluble in chloroform, and by their property of being able to give highly concentrated and viscous solutions of cellulose acetates, in alcohol-chloroform or in alcohol-tetrachlorethane (mixtures of, say, equal volumes of alcohol and chloroform, or alcohol and tetrachlorethane, respectively).

Those products which are completely or partially soluble in alcohol-benzene and other solvents, are of particular interest.

In order to illustrate my invention I give the following examples, the parts being by weight, but it is to be noted that the invention is not limited to these examples.

Example I: 200 parts of cellulose, for example cotton containing about 5% of moisture, are treated with a mixture of 800 parts of glacial acetic acid and 20 parts of concentrated sulfuric acid. Into this mixture, while constantly stirring, and at ordinary room temperature, or by cooling, 400 parts of acetic anhydrid are slowly added. This addition may be made at once or after 2 or 3 hours or more. As soon as the material dissolves, water may be added, while constantly stirring, to precipitate the cellulose acetate which is then washed, pressed, and dried. This product is insoluble in chloroform but swells therein, it is soluble giving highly concentrated and viscous solutions in alcohol-chloroform or in alcohol-tetrachlorethane, etc., (these solvents for example being composed of equal volumes of the two liquids). The product shrinks in pure acetone and forms a transparent, semifluid mass which by the addition of a small amount of water produces a viscous solution. Without precipitation by water the solution obtained by acetylization can also be employed directly or after neutralization of the mineral acid for the manufacture of artificial silk, or other threads or for other purposes.

Example II: 200 parts of cotton having a moisture content of about 5% are treated in the same manner with the mixture of 800 parts of glacial acetic acid and 20 parts of concentrated sulfuric acid. Directly, or after two to three hours approximately 600 parts of acetic anhydrid are added, while constantly stirring and while preventing any substantial rise in temperature, the product is a viscous solution similar to that produced in example I which can be worked up in the same manner. If desired the cellulose can also be directly introduced into the acetylizing mixture. The resulting product shows a similar behavior, but in the latter case it may also be soluble in pure acetone.

Example III: 200 parts of dry paper, such as is used in the manufacture of nitrocellulose for celluloid, are treated with a mixture of 800 parts of glacial acetic acid and 40 parts of concentrated sulfuric acid, and after 2 or 3 hours 650 to 700 parts of acetic anhydrid are introduced, preferably while the mixture is maintained at or below ordinary room temperature, and while stirring. A product is obtained similar to that of example II, and is worked up in the same manner.

In these examples, the cotton or paper may be replaced by other forms of cellulose, or by their products of transformation. Commercial sulfuric acid, glacial acetic acid, and acetic anhydrid can be used, of which the strength varies more or less or other acetylizing or diluting agents may be employed.

The proportions of sulfuric acid, glacial acetic acid, acetic anhydrid, and cellulose should not be greatly varied. The amount of moisture in the cellulose may vary somewhat. The cellulose esters may be separated or precipitated from their solutions in any appropriate manner.

In a very advanced reaction with acetylation solutions, being more movable or more fluid, the precipitated acetate after drying, becomes fluid in chloroform, without dissolving therein. The same remarks apply generally to tetrachlorethane, as to chloroform, but upon addition of more or less alcohol, either to the chloroform or the tetrachlorethane, the cellulose acetate readily dissolves to produce a viscous solution, according to the duration of the reaction, and it becomes soluble in concentrated or diluted acetone. These products are insoluble in pure alcohol and in diluted alcohol, and become soluble therein, only by the further treatment as per my copending applications 782,530, filed August 1, 1913, and 73,496, filed January 21, 1916.

What I claim is:—

1. A process of directly producing cellulose acetates substantially insoluble in chloroform, and insoluble in alcohol, but readily soluble in alcohol-chloroform, which comprises reacting upon cellulose with sulfuric acid and acetic anhydrid in proportions of about 10 parts of cellulose, not more than 2½ parts of sulfuric acid, and about 15 to 30 parts of acetic anhydrid, at a temperature not above 40° C.

2. A process of directly producing cellulose acetates, insoluble in chloroform and in alcohol, but soluble in chloroform-alcohol, which comprises reacting upon cellulose with sulfuric acid and acetic anhydrid in proportions of about 10 parts of moist cellulose, about 1 part of sulfuric acid, and about 15 to 30 parts of acetic anhydrid, at a temperature not above room temperature.

3. A process of directly producing cellulose acetate substantially insoluble in chloroform which comprises treating 200 parts of cellulosic material containing about 5% of moisture with a mixture of glacial acetic acid and about 20 parts of sulfuric acid, then adding, while stirring, and while not above ordinary room temperature about 400 parts of acetic anhydrid, then after the cellulose has been transformed into acetates which have gone into solution, precipitating by adding the reaction mixture to water while stirring, separating the precipitated cellulose acetates, and drying the same.

4. A process of directly preparing cellulose acetates substantially insoluble in chloroform and in alcohol but readily soluble in alcohol-chloroform, which comprises treating a cellulosic material containing about 5 to 6% of moisture with not less than 1½ times its weight of an acetylizing agent, at a temperature below about 40° C., in the presence of not more than about 10% of its weight of sulfuric acid as a condensing agent.

5. A process of directly preparing a class of cellulose esters which are insoluble in chloroform and insoluble in alcohol, but which are readily soluble in chloroform-alcohol, which comprises treating 100 parts of a cellusosic material with a mixture including from 150 to 300 parts of acetic anhydrid and a condensing agent corresponding to about 10 parts of sulfuric acid, said reaction being performed at a temperature maintained lower than 40° C.

6. A process of making cellulose acetates which comprises reacting upon cellulose with sulfuric acid and acetic anhydrid in proportions of about 10 parts of cellulose, about 1 part of sulfuric acid, and about 15 to 30 parts of acetic anhydrid, at a temperature maintained lower than 40° C., in the presence of a liquid material capable of diluting the liquid reagents employed, but incapable of preventing the acetylizing action upon the cellulosic material.

7. The process of making cellulose acetates substantially insoluble in chloroform and in alcohol, but readily soluble in alcohol-chloroform, which comprises introducing 100 parts of cellulose containing about 5% of moisture into a mixture containing glacial acetic acid and about 10 parts of concentrated sulfuric acid, and allowing the materials to react, and thereafter introducing an acetylyzing agent, while the mixture containing the sulfuric and glacial acetic acids and the acetylizing agent are at a temperature not above ordinary room temperature.

8. A process of producing cellulose acetates, substantially insoluble in chloroform and in alcohol, in a direct manner, which comprises mixing together 800 parts of glacial acetic acid and 20 parts of concentrated sulfuric acid, and introducing thereinto about 200 parts of cellulose containing about 5% of moisture, and thereafter adding, while maintaining the mixture at not above ordinary room temperature, about 400 parts of acetic anhydrid.

9. A process of directly producing cellulose acetates substantially insoluble in chloroform and in alcohol, but readily soluble in chloroform-alcohol, which comprises reacting upon cellulose containing not more than about 6% of moisture with about double its weight of acetic anhydrid, in the presence of not more than about 25% of sulfuric acid as a condensing agent, at not above ordinary room temperature.

10. A cellulose acetate substantially insoluble in alcohol and in chloroform, but readily soluble in alcohol-chloroform and in alcohol-tetrachlorethane, said product being further characterized by giving upon further treatment with acids, with or without the addition of water, cellulose esters very soluble in acetone.

11. A class of cellulose esters being insoluble in chloroform and insoluble in alcohol, but soluble in alcohol-chloroform, which are further characterized by giving upon a further treatment with acids or acid salts or mixtures thereof at first cellulose esters soluble in pure acetone, and which by prolonging the treatment with acids, acid salts or mixtures thereof produce cellulose esters soluble in dilute acetone and by further prolonging finally produce esters soluble in water.

12. A cellulose acetate insoluble in chloroform but soluble in alcohol-chloroform, said product being further characterized by giving upon further treatment with acids, with or without the addition of water, cellulose esters soluble in pure acetone, and which by further treatment with acids give products soluble in water.

In testimony whereof I have hereunto set my hand in the presence of two subscribing witnesses.

Paris, dated this 20th day of September, 1911.

Dr. HENRY DREYFUS.

Witnesses:
 H. C. Coxe,
 Camille Dreyfus.